(12) United States Patent
Hara et al.

(10) Patent No.: US 7,516,812 B2
(45) Date of Patent: Apr. 14, 2009

(54) STEERING CONTROL APPARATUS AND METHOD

(75) Inventors: Kazuo Hara, Atsugi (JP); Takaaki Eguchi, Yokohama (JP)

(73) Assignee: Nissan Motor Co., Ltd, Yokohama-shi, Kanagawa (JP)

( * ) Notice: Subject to any disclaimer, the term of this patent is extended or adjusted under 35 U.S.C. 154(b) by 388 days.

(21) Appl. No.: 10/575,205

(22) PCT Filed: Dec. 1, 2005

(86) PCT No.: PCT/IB2005/003627

§ 371 (c)(1),
(2), (4) Date: Apr. 10, 2006

(87) PCT Pub. No.: WO2006/059214

PCT Pub. Date: Jun. 8, 2006

(65) Prior Publication Data

US 2008/0230300 A1 Sep. 25, 2008

(30) Foreign Application Priority Data

Dec. 2, 2004 (JP) ............................. 2004-350371

(51) Int. Cl.
*B62D 5/00* (2006.01)

(52) U.S. Cl. ...................................... 180/405; 180/402
(58) Field of Classification Search ................. 180/402, 180/403, 405, 444
See application file for complete search history.

(56) References Cited

U.S. PATENT DOCUMENTS

| 6,886,656 | B2 * | 5/2005 | Fujioka et al. | 180/402 |
| 7,275,617 | B2 * | 10/2007 | Endo et al. | 180/402 |
| 2004/0200661 | A1 * | 10/2004 | Sugitani et al. | 180/402 |
| 2004/0238258 | A1 * | 12/2004 | Ono et al. | 180/402 |
| 2005/0039971 | A1 * | 2/2005 | Fujioka et al. | 180/402 |

* cited by examiner

*Primary Examiner*—Tony H. Winner
(74) *Attorney, Agent, or Firm*—Young Basile

(57) ABSTRACT

A vehicle steering control device is provided that suppresses changes in the steering force accompanying the shock transmitted from the road surface during the steering wheel return operation. The vehicle steering device is a steer-by-wire steering device where a steering wheel receiving the steering input which is transmitted electronically to the steering unit which turns steered road wheels of the vehicle. The steering reaction force correction (Gf×F) corresponding to road surface reaction force F is applied to the steering wheel. The device includes a turn/return sensor that senses turn/return of the steering wheel, and during return of steering wheel, road surface reaction force feedback gain Gf is made smaller than the initial turning.

23 Claims, 7 Drawing Sheets

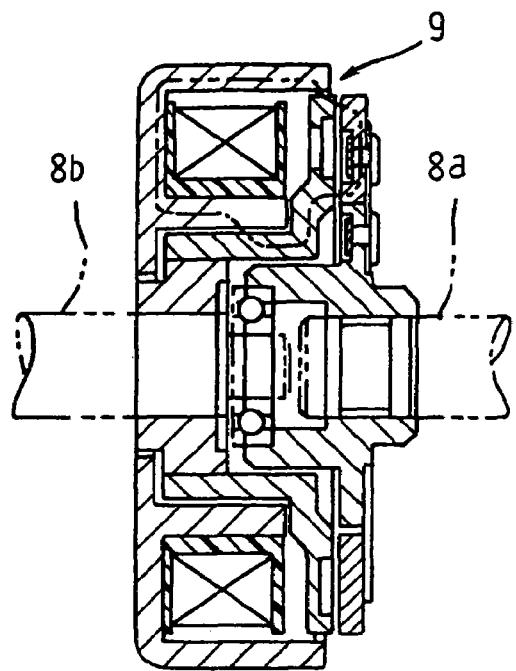
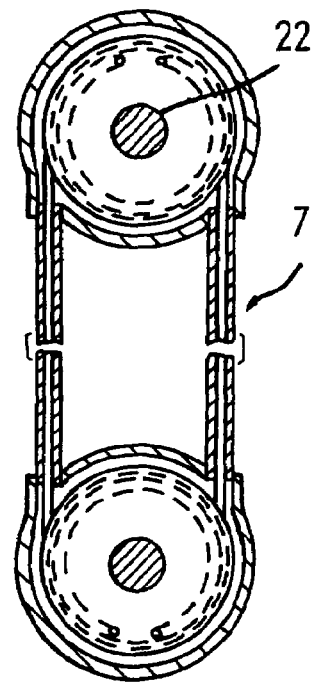
FIG. 2A      FIG. 2B
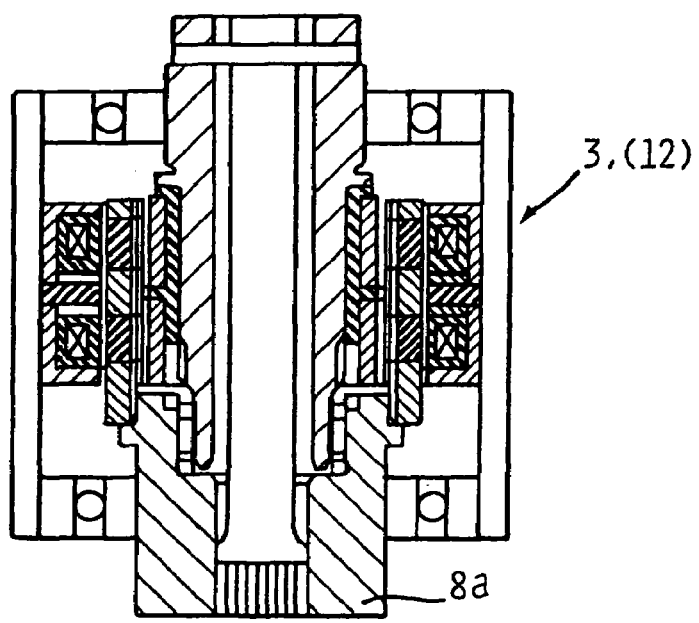
FIG. 2C

1

STEERING CONTROL APPARATUS AND METHOD

BACKGROUND

The present invention relates to the field of steering control for vehicles and in particular to electronic steering control systems.

In a conventional steer-by-wire system as described in Japanese Kokai Patent Application No. Hei 10[1998]-217988, the steering reaction force correction proportional to the detected road surface reaction force is computed and added to the steering reaction force, so that the condition of the road surface is transmitted to the driver.

However, in the vehicle steering device of the prior art, for example, when the vehicle turns an L-shaped corner so that a quick steering wheel response is required, or a shock from the road surface is transmitted due to a bumpy road surface as the steering wheel is turned back, a transient steering force occurs abruptly, the steering wheel may hinder the turning back of the steering wheel, which is undesirable.

In the vehicle steering device described in Japanese Kokai Patent Application No. Hei 10[1998]-217988, and particularly in the steering force computation unit, on the basis of the detection result of the steering force sensor, a steering force (T) applied to the steering column (steering shaft) is computed. At the same time, a control value (aT) (where a is the coefficient corresponding to the steering force gear ratio) for rotating the steering shaft in the direction of applied steering force (T) is also computed.

The road surface reaction force from the steering reaction force sensor is transmitted to the steering reaction force, for example, when the vehicle turns an L-shaped corner, so that quick return steering is required. If the tire dips due to the rough road surface (holes, etc.), due to the signal from the steering reaction force sensor, quick maneuvering of the steering wheel may be hindered, which is undesirable (see FIG. 7). If the embodiment of the present invention is not applied, this occurs because the steering reaction force is added to track the kickback from the road surface, the steering force rises abruptly, and it becomes difficult for the driver to respond quickly.

SUMMARY

In accordance with one aspect of the invention, a steering control device is provided for use in a vehicle having a steering wheel that receives steering input, and an electronically-controlled steering unit that turns the vehicle's wheels over a road surface based on the position of the steering wheel. The steering control device includes a reaction force device coupled to the steering wheel and responsive to a control signal to apply a steering reaction force to the steering wheel; and a controller adapted to generate the control signal in response to the movement of the steering wheel and the road surface reaction force. The controller varies the control signal to increase the steering reaction force in response to the road surface reaction force when the steering wheel is turning and to decrease the reaction force in response to the road surface force when the steering wheel is returning.

In accordance with another aspect of the invention, a method for controlling steering in a vehicle having a steering wheel and a reaction device to impose a steering reaction force onto the steering wheel in response to a steering force control signal. The method includes calculating the steering force control signal based on a road surface reaction force and a gain; determining whether the steering wheel is in a turning or returning mode; and setting the gain at a higher value when the steering wheel is in a turning mode.

BRIEF DESCRIPTION OF THE DRAWINGS

The description herein makes reference to the accompanying drawings wherein like reference numerals refer to like parts throughout the several views, and wherein:

FIG. 2A is a detailed sectional diagram illustrating the clutch, in the vehicle steering device of the first embodiment.

FIG. 2B is a detailed sectional diagram illustrating the cable column in the vehicle steering device of the first embodiment.

FIG. 2C is a detailed sectional diagram illustrating the torque sensor in the vehicle steering device of the first embodiment.

DETAILED DESCRIPTION

Figure 1:
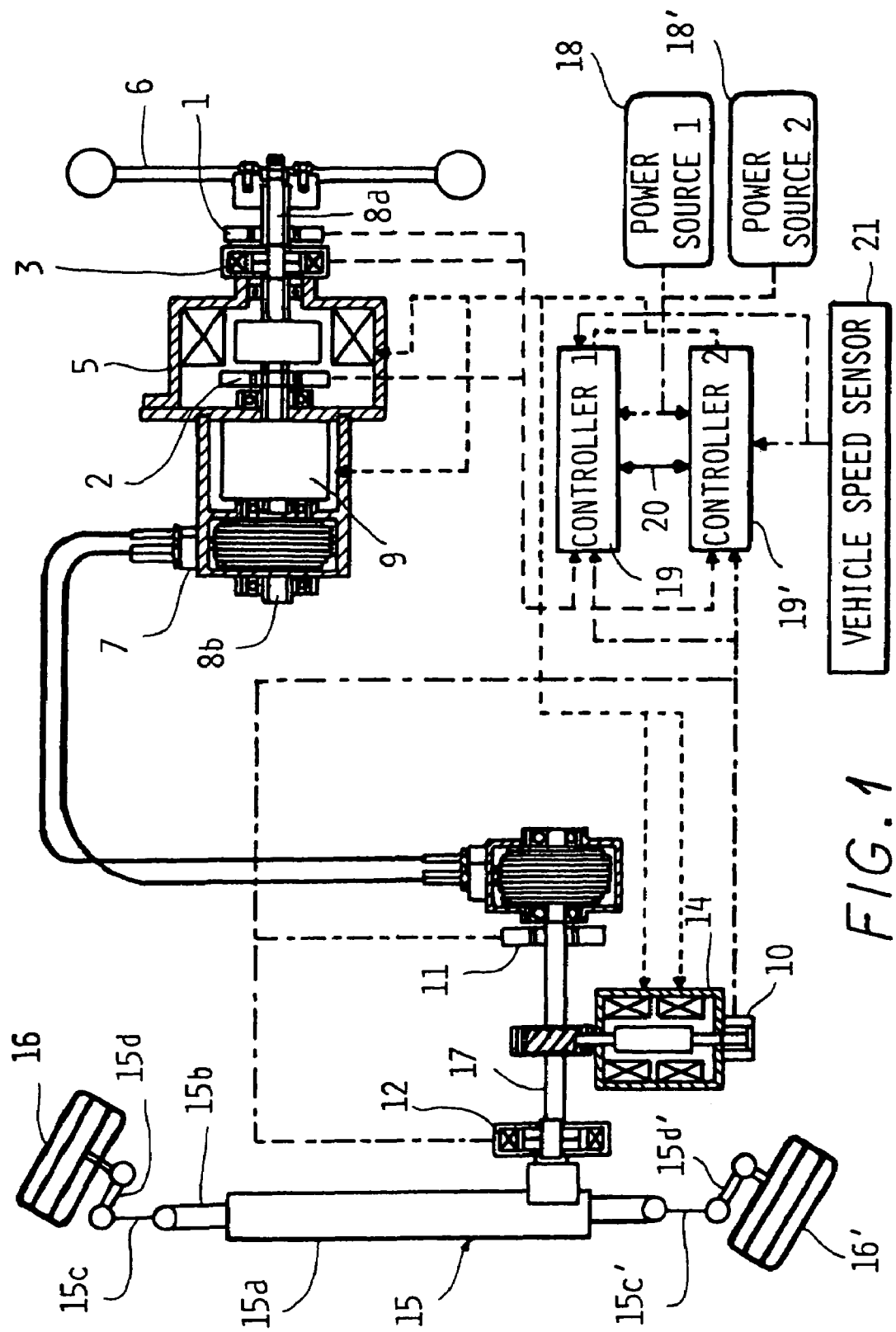
FIG. 1 is a schematic system diagram illustrating the vehicle steering system according to the first embodiment.

FIG. 1 is an overall system diagram illustrating the vehicle steering device of the first embodiment. FIGS. 2a-c are detailed diagrams illustrating the clutch, cable column, and torque sensor components, respectively, in the vehicle steering device of the first embodiment. The vehicle steering device of composed of a reaction force device, an auxiliary device, an electronically-controlled steering device, and a controller.

The reaction force device has steering angle sensor 1, encoder 2, torque sensors 3, and reaction force motor 5.

The steering angle sensor 1 is a means for detecting the angular position of steering wheel 6. It is set on a column shaft 8a that connects a cable column 7 and a steering wheel 6. That is, steering angle sensor 1 is placed between steering wheel 6 and torque sensors 3 and is unaffected by the change in angle due to the twisting of torque sensors 3 so that the sensor 1 can detect the steering angle. In the steering angle sensor 1, an absolute type resolver (not shown) or the like is used.

The torque sensors 3 form a double system and are arranged between the steering angle sensor 1 and reaction force motor 5. The system is made up of two torque sensors, that is, torque sensor 3 and torque sensor 12. FIG. 2C is a diagram illustrating in detail a torque sensor unit. Each torque sensor 3 has a torsion bar extending in the axial direction, a first shaft connected to one end of the torsion bar and coaxial to the torsion bar, a second shaft connected to the other end of the torsion bar and is coaxial to the torsion bar and the first shaft, a first magnetic body fixed to the first shaft, a second magnetic body fixed to the second shaft, a coil facing the first magnetic body and the second magnetic body, and a third magnetic body that forms a magnetic circuit together with the first magnetic body and second magnetic body. The coil detects the torque from the output signal on the basis of the inductance that changes corresponding to the relative displacement between the first magnetic body and the second magnetic body on the basis of the twisting of the torsion bar.

The reaction force motor 5 is a reaction force actuator that imparts a reaction force to the steering wheel 6. The reaction force motor 5 is made of a 1-rotor/1-stator type of electric motor with the column shaft 8a as the rotary shaft. The housing is fixed at an appropriate location on the vehicle body. A brushless motor is used as the reaction force motor 5 with the encoder 2 and a Hall IC (not shown in the figure), which are required for use with a brushless motor. If only a Hall IC is used, although it will be possible to drive the motor that generates the motor torque, nevertheless there will be small variations in the output torque, and the feel of the steering reaction force will be poor. In order to effect smoother control of the reaction force, encoder 2 is placed on the shaft of column shaft 8a to control the motor. As a result, the small torque variations can be reduced, and the steering reaction force feel is improved. As an alternative, a resolver can be used in place of encoder 2.

The auxiliary unit is composed of cable column 7 and clutch 9. The clutch 9 is arranged between column shaft 8a and pulley shaft 8b. An electromagnetic clutch is used in the first embodiment. FIG. 2A is a diagram illustrating in detail the clutch component 9. When power is turned on to the electromagnetic clutch, clutch 9 generates magnetic flux Φ. In this case, because the armature is magnetically drawn to the brushes of the rotor against the restoring force of a leaf spring, column shaft 8a, the input shaft, and pulley shaft 8b, the output shaft, are connected to each other. Then, as steering wheel 6 is rotated, its rotational force is transmitted via clutch 9 to the pulley of cable column 7 to rotate the pulley of cable column 7. As a result, the rotational force is transmitted via clutch 9 to steering wheel 6. Also, when the power is turned off to the electromagnetic coil, magnetic flux Φ collapses, and the armature leaves the rotor due to the restoring force of the leaf spring. That is, the transmission torque capacity of clutch 9 can be set as desired by changing the drawing force as magnetic flux Φ generated by the magnetic coil is changed. Also, a scheme in which the clutch is released when the power is turned on may also be used.

The cable column 7 has a mechanical backup mechanism that can play the part of the column shaft in transmitting the torque while it detours to avoid interference with the element included between the reaction force device and the steering device. FIG. 2B is a diagram illustrating in detail the cable column unit. In the structure of cable column 7, two interior cables, each end of which is fixed to a reel 22, are wound onto the two reels 22, and the two ends of the exterior sheath in which two inner cables are inserted are fixed to two reel housings.

The steering unit includes encoder 10, steering angle sensor 11, torque sensors 12, steering motors 14, steering unit (steered wheel turning unit) 15, and steered wheels 16, 16'.

The steering angle sensor 11 and torque sensors 12 are mounted on pinion shaft 17, on one end of which the pulley of cable column 7 is attached, and on the other end of which a pinion gear is formed. As a steering angle sensor 11, an absolute type resolver or the like, which detects the rotational velocity of the shaft can be used. Also, torque sensors 3, and torque sensors 12 form a double system that detects torque from changes in inductance. Steering angle sensor 11 is set on the side of cable column 7, and torque sensors 12 are set on the side of steering unit 15. As a result, when the steering angle is detected by steering angle sensor 11, it is unaffected by the change in the angle due to the twisting of torque sensors 12.

The steering motors 14 have a structure in which a pinion gear engaged to the worm gear set at the central position between steering angle sensor 11 of the pinion shaft 17 and torque sensors 12 is set on the motor shaft, so that a steering torque is applied to pinion shaft 17 when the motor is on. The steering motors 14 form a double system with a 1-rotor/2-stator structure. The steering motors 14 are brushless motors that form first and second steering motors 14. Similarly, in the reaction force motor 5, since brushless motors are used, encoder 10 and a Hall IC (not shown in the figure) are used.

The steering unit 15 has a structure in which left/right steered road wheels 16, 16' turn as pinion shaft 17 rotates. It has rack shaft 15b that forms a rack gear engaged with the pinion gear of pinion shaft 17 and inserted in rack tube 15a, tie rods 15c, 15c' fixed to the two ends of rack shaft 15b extending in the left/right direction of the vehicle, and knuckle arms 15d, 15d' having one end fixed to the tie rods 15c, 15c' and the other end fixed to the steered road wheels 16, 16'.

The controller has a double system design composed of two power sources 18, 18' and two controllers 19, 19' that perform processing and arithmetic operations.

The controllers 19, 19' receive the detected signals from the following parts: steering angle sensor 1, encoder 2, torque sensors 3, and the Hall IC of the reaction force device, as well as encoder 10, steering angle sensor 11, torque sensors 12, Hall IC, and vehicle speed sensor 21 (vehicle speed detection means) of the steering device.

On the basis of the detection values of the various sensors, controller 19 sets the control quantities of reaction force motor 5 and steering motor 14, and controls and drives each of steering motors 14. Also, during ordinary system conditions, controller 19 releases the clutch 9. Otherwise, the system engages clutch 9 to establish a mechanical connection between steering wheel 6 and the steered road wheels 16, 16'.

By means of steering motor 14, the following formula I is used to set control value (Th) of reaction force motor 5 for computing the reaction force motor control valve.

$$Th = Kp \times \theta + Gf \times F \quad (1)$$

Here, (Kp) represents the steering angle feedback gain, θ represents the steering angle, (Gf) represents the road surface reaction force feedback gain, (F) represents the road surface reaction force. The first term on the right-hand side sets the control value of the steering reaction force on the basis of steering angle θ, and the second term on the right-hand side sets the control value on the basis of road surface reaction force (F), so that it can reflect the influence on the steering reaction force of the force on the tires from the road surface on the tires.

Here, road surface reaction force feedback gain (Gf) changes as a function of the steering state. Its value is set such that in the case of turning the steering wheel, the road surface feel is transmitted to the driver through an appropriate steering reaction force. The amount of feedback of the road surface reaction force component is set smaller so that during the steering wheel return operation, the steering wheel is not hindered by excessive shock forces, etc.

The road surface reaction force feedback gain (Gf) is as follows:

Gf(low)=(Low) . . . during the steering wheel return operation

Gf(High)=(High) . . . during the steering wheel turning operation

Figure 4:
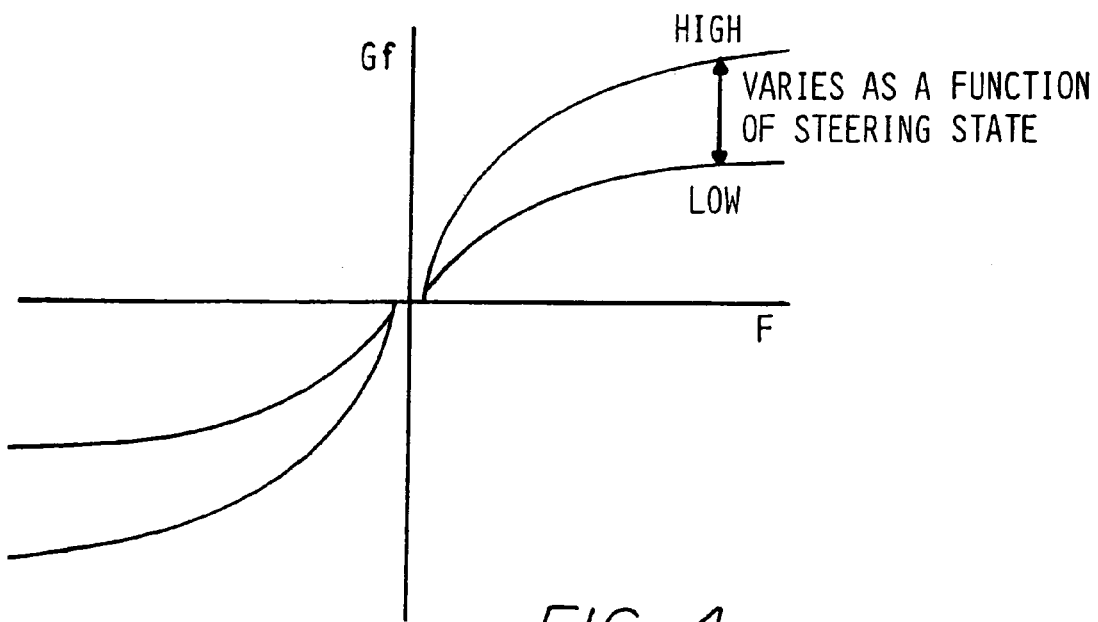
FIG. 4 is a graph road surface reaction force feedback gain (Gf) corresponding to road surface reaction force (F).

The (Low), (High) are determined on the basis of the graph to be explained below (FIG. 4). However, they may also be preset constants.

Also, on the right-hand side of formula (I), it is possible to set the control value on the basis of steering angle velocity $d\theta/dt$ and steering angle acceleration $d^2\theta/dt^2$. In this case, control value (Th) of reaction force motor (4) is determined according to Equation 2 below.

$$Th = Kp \times \theta + Kd \times d\theta/dt + Kdd \times d^2\theta/dt^2 + Gf \times F \qquad (2)$$

Here, Kd and Kdd are preset constants.

Figure 3:
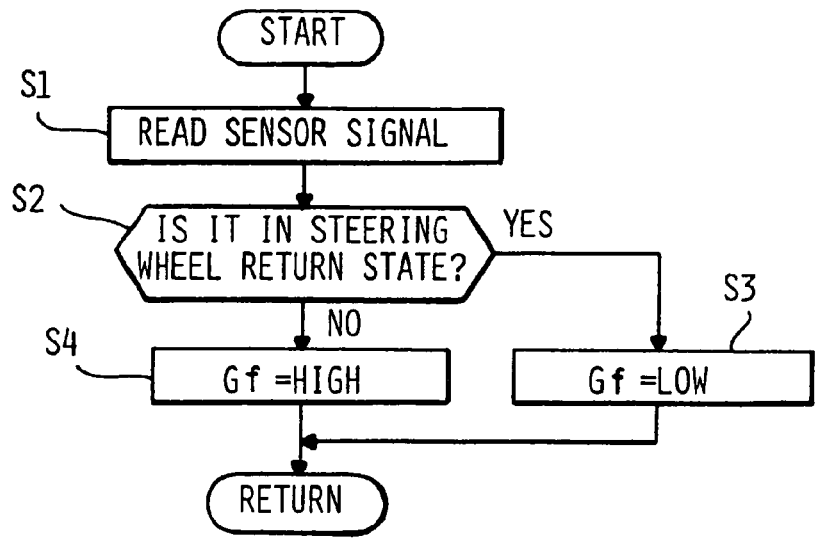
FIG. 3 is a flow chart illustrating the method for setting road surface reaction force feedback gain (Gf) according to the first embodiment.

Setting of the road surface reaction force feedback gain is discussed hereinafter. FIG. 3 is a flow chart illustrating the method for setting road surface reaction force feedback gain (Gf). Each step will be explained below.

In step S1, the signal from steering angle sensor 1 is read, and process control then goes to step S2.

In step S2, from the sensor signal read in step S1, the steering angle and steering angle velocity are computed (corresponding to the steering angle velocity detection means), and it is determined whether the steering wheel is in the return state (corresponding to the turn/return judgment means). If YES, control goes to step S3, and if NO, it goes to step S4.

In step S3, the road surface reaction force feedback gain (Gf) is set Low (corresponding to the steering reaction force correction means), and it returns.

In step S4, road surface reaction force feedback gain (Gf) is set to High, and it returns.

FIG. 4 is a graph used to set road surface reaction force feedback gain (Gf) corresponding to road surface reaction force F. In this case of steering wheel return (Low), compared with the case of steering wheel turn (High), road surface reaction force feedback gain (Gf) is set to a smaller value with respect to road surface reaction force F.

Setting the control value corresponding to the steering state is discussed hereinafter. When it is necessary to execute quick return of the steering wheel, in order to ensure that the steering wheel return operation of the driver is not hindered in the first embodiment, as the steering angle velocity $d\theta/dt$ increases, the amount of feedback from the road surface reaction force decreases.

Road surface reaction force feedback gain (Gf) becomes the following:

Gf(low)=(Low)×L1 . . . . During the steering wheel return operation

Gf(High)=(high) . . . during the steering wheel turn Operation

Figure 5:
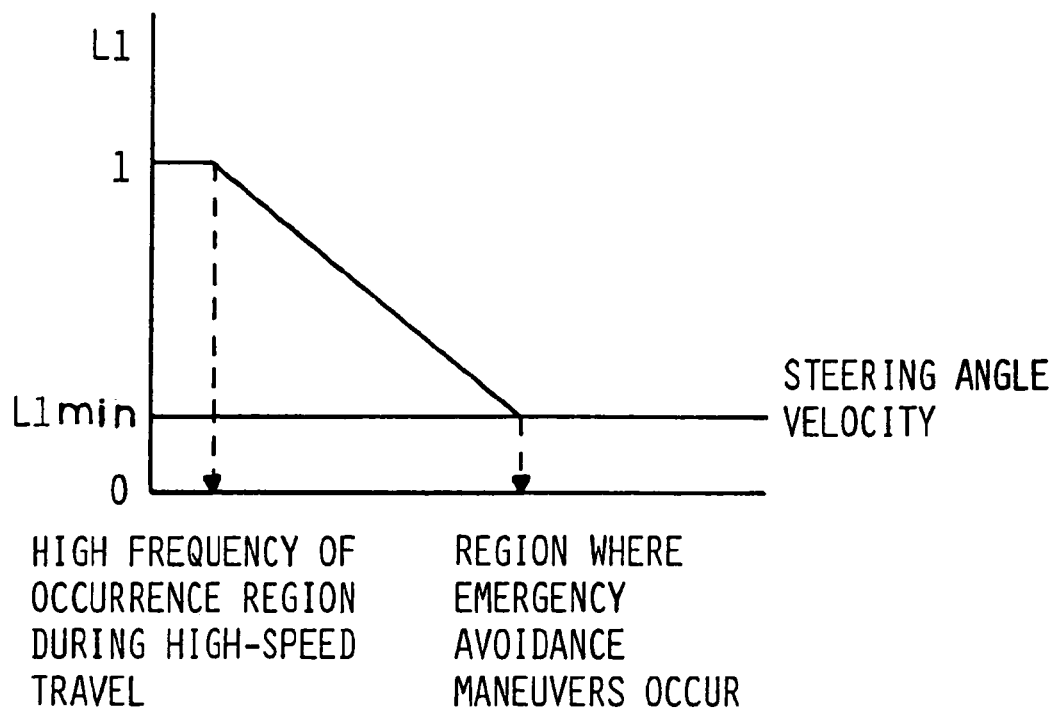
FIG. 5 is a graph of variable L1 corresponding to steering angle velocity $d\theta/dt$.

Here, (L1) is set on the basis of the graph shown in FIG. 5. In the graph shown in FIG. 5, (L1) has a maximum value of 1 in the range of high frequency of occurrence generated for steering angle velocity $d\theta/dt$ in the case of high vehicle speed, and the value decreases as the steering angle velocity $d\theta/dt$ rises. When the steering angle velocity $d\theta/dt$ reaches the region of emergency avoidance maneuvers, the value L1 reaches the maintain value, L1min.

Setting the control value corresponding to the vehicle speed is discussed hereinafter. In the first embodiment, because there are more instances of quick steering wheel return when vehicle speed (V) decreases, the road surface reaction force amount of feedback in the steering wheel return operation is set smaller in the low velocity region. That is, the higher the speed, the more sensitive the vehicle behavior with respect to steering wheel maneuvering, so that even in the steering wheel return operation, road surface reaction force feedback is still required. On the other hand, in the turn area of the low speed region, smooth steering wheel maneuverability is required. Consequently, in light of this fact, the amount of feedback for the road surface reaction force is set to be smaller in the case of steering wheel return when the vehicle speed (V) is lower.

Consequently, road surface reaction force feedback gain (Gf) is as follows:

Gf(Low)=(Low)×L1×L2 . . . during the steering wheel return operation

Gf(High)=(High) . . . during the steering wheel turning operation

Figure 6:
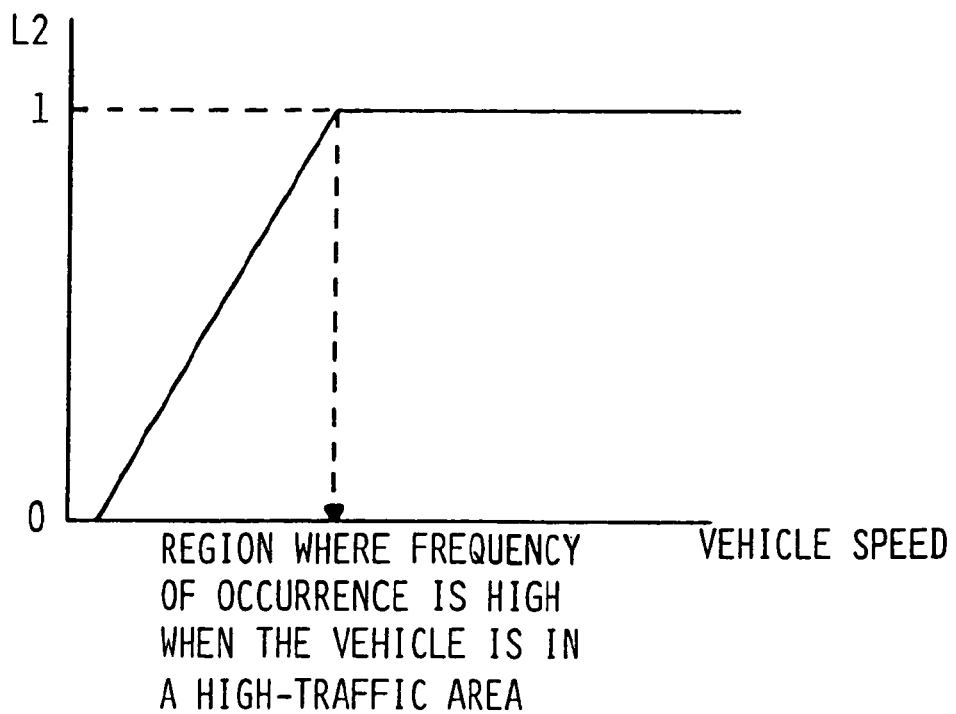
FIG. 6 is a graph of variable L2 corresponding to vehicle speed (V).
Figure 7:
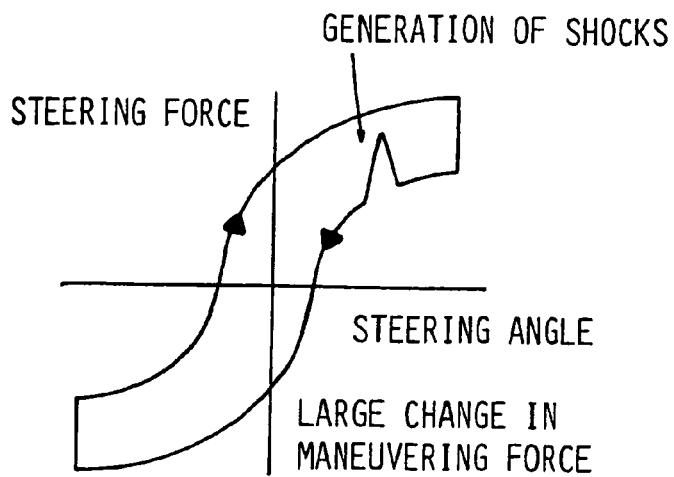
FIG. 7 is a graph of steering reaction force corresponding to steering angle in the turn and return operation of a steering wheel.

Here, (L2) is set on the basis of the graph shown in FIG. 6. In the graph shown in FIG. 6, (L2) rises in proportion to vehicle speed V. It is set such that it reaches the maximum value 1 when vehicle speed (V) reaches the high frequency of occurrence region when the vehicle is in a high-traffic area.

In the steering reaction force computation unit, the average value of the detection results (F1), (F2) of the steering reaction force sensors set at the two ends of the steering rack is taken as steering reaction force (F) is applied to the steering shaft (pinion shaft). In the steering shaft motor, on the basis of these computational results, rotation control value (Mm) of the steering shaft is computed using the following Equation 3, and the reaction force control signal corresponding to rotation control value Mm is output to steering shaft motor.

$$Mm = Gm \times (aT - F) \qquad (3)$$

Here, (Gm) represents the gain coefficient indicating the gain of the output signal.

Figure 8:
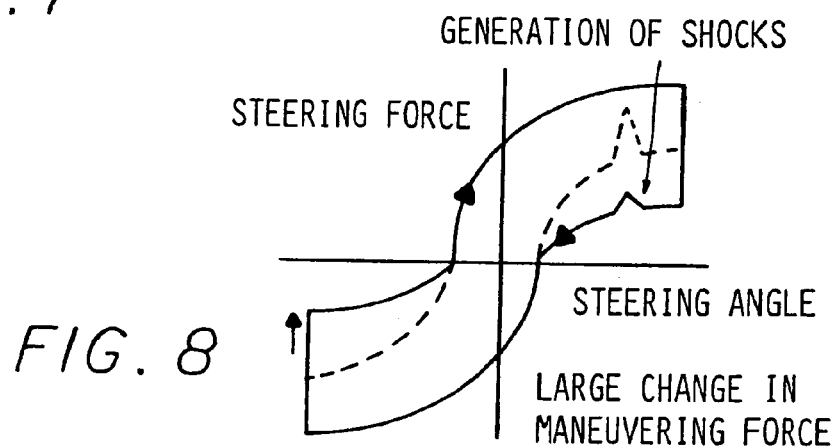
FIG. 8 is a graph of steering reaction force corresponding to steering angle in the turn and return operation of a steering wheel in accordance with the first embodiment of the invention.

In the first embodiment, because road surface reaction force feedback gain (Gf) is made smaller in the steering wheel return operation in the steering device, even if the road surface reaction force rises transiently due to the rough road surface, changes in the steering force accompanying the shock are suppressed. Therefore, the problem of hindering quick maneuvering of the steering wheel can be alleviated (FIG. 8), so that the driver can return back the steering wheel to the center position smoothly.

Also, when steering angle velocity $d\theta/dt$ is higher, road surface reaction force feedback gain (Gf) becomes smaller. Consequently, in the case of quick return steering, by suppressing changes in the steering force accompanying shock can be suppressed, and quicker return steering by the driver is not hindered. In addition, when vehicle speed (V) is lower, road surface reaction force feedback gain (Gf) becomes smaller. Consequently, a good maneuvering of the steering wheel in the low-speed region and a high vehicular travel stability in the high-speed region can be realized at the same time.

The effects of the vehicle steering device of the first embodiment will now be discussed. In the vehicle steering device, the steering wheel 6, which receives the steering input, and the steering unit 15, which steers the steered road wheels 16, 16', are mechanically separated. Corresponding to road surface reaction force F, steering reaction force correction (Gf×F) is added to steering wheel 6. The vehicle steering device includes the following parts: turn/return judgment means that judges turn/return of steering wheel 6, and a steering reaction force correction means that has a smaller road surface reaction force feedback gain (Gf) during return of steering wheel 1 than during its initial turning. It is possible to suppress the change in the steering force accompanying the shock from the road, and it is possible to reduce the probability of an ineffective steering wheel.

Because the steering reaction force correction means has a smaller road surface reaction force feedback gain (Gf) for a higher steering angle velocity dθ/dt of steering wheel 1, it is possible to ensure that an even quicker return of the steering wheel 6 by the driver is not hindered.

Because the steering reaction force correction means has a smaller road surface reaction force feedback gain (Gf) for a lower vehicle speed V, it is possible both to feed back the road surface reaction force in the high-speed region and to improve the steering wheel return operation in the low-speed region.

In the second embodiment, the road surface reaction force amount of feedback is changed corresponding to the vehicle state value. The structure of the second embodiment is the same as that of the first embodiment shown in FIGS. 1 and 2, so that its explanation will not be repeated.

The control value is set corresponding to the vehicle state value. If the amount of feedback of the road surface reaction force in the steering wheel return operation is set to a small value, the overall steering reaction force may become too small. In this case, as the vehicle state value, the yaw rate is computed (corresponding to the vehicle state value detection means). It also computes gain constant (Gy) corresponding to the amount of feedback of the road surface reaction force or lower and reduction component (YD) of the amount of feedback of the road surface reaction force. By adding it to the control value of reaction force motor (4), it is possible to prevent the steering reaction force from becoming too small.

In the second embodiment, on the right-hand side of Equation 2, the control value is set and added on the basis of yaw rate ψ which indicates the behavior of the vehicle. Consequently, control value (Th) of reaction force motor (4) can be described by Equation 4 below.

$$Th = Kp \times \theta + Kd \times d\theta/dt + Kdd \times d^2\theta/dt^2 + Ky \times \psi + Gf \times F \quad (4)$$

The method for computing the yaw rate is discussed hereinafter. The yaw rate ψ can be obtained using the Equation 5 below from steering angle θ and vehicle speed (V) by means of a mathematical operation on the vehicle movement.

$$\psi = \{G \times \omega n^2 \times Tr(s + 1/Tr) \times \theta\}/(s^2 + 2\xi\omega ns + \omega^2) \quad (5)$$

$G = \{1/(1 + A \times V^2)\} \times (V/L)$
$Tr = (2\ Lr \times Kr)/(m \times Lf \times V)$
$A = (m/2L^2) \times \{(Lf \times Kf - Lr \times Kr) \times (Kf \times Kr)\}$ Here, Lf represents the distance between the center of gravity and the front shaft, Lr represents the distance between the center of gravity and the rear shaft, Kf represents the cornering force of the front wheels, Kr represents the cornering force of the rear wheels, m represents the weight of the vehicle, and s represents the Laplace operator.

Consequently, the value obtained using the Equation 5 is used as the estimated value of yaw rate ψ.

Using vehicle speed (V), there is the following relationship of Equation 6 between lateral acceleration (Yg) and yaw rate ψ.

$$Yg = \psi \times V \quad (6)$$

Also, as far as road surface reaction force (F) is concerned, when steady-state circular rotation free of external disturbance is performed, the relationship of the following Equation 7 is established.

$$F \propto Yg \quad (7)$$

Consequently, one has the following relationship:

$$F \propto \psi \times V \quad (7)'$$

Figure 9:
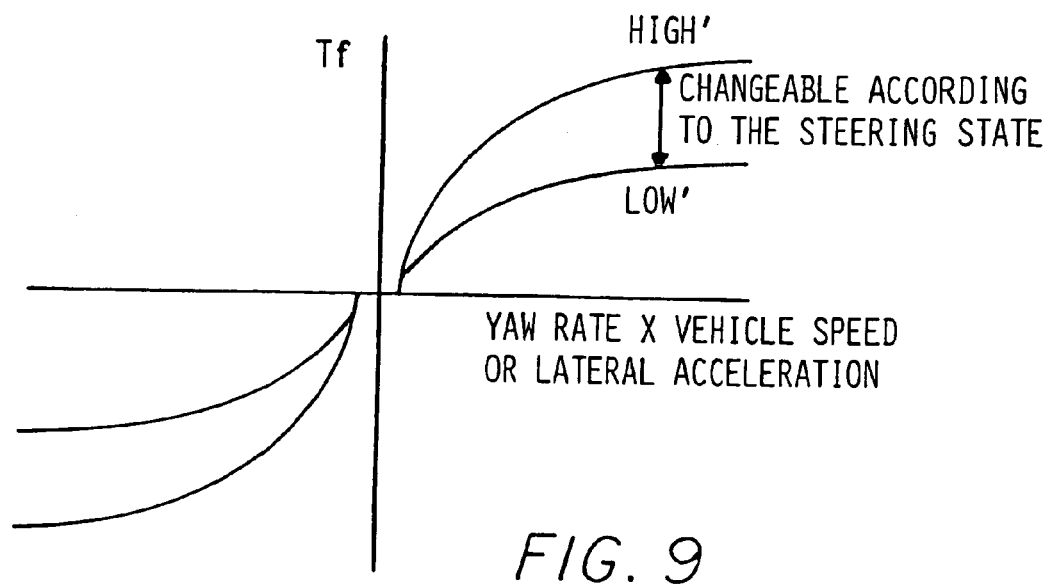
FIG. 9 is a graph shows the graph used to set (YD).

For a decrease (YD) of the amount of feedback of the road surface reaction force in the steering wheel return operation, from the graph shown in FIG. 9, the High' value and Low' value of (Tf) are read corresponding to ψ×(V), and it becomes the following Equation 8 (corresponding to the steering reaction force correction value estimation means).

$$YD = Tf \times \text{High}' - Tf \text{Low}' \quad (8)$$

The value obtained by multiplying preset gain constant Gy by (YD) is added to control value (Th) of reaction force motor (5).

Figure 10:
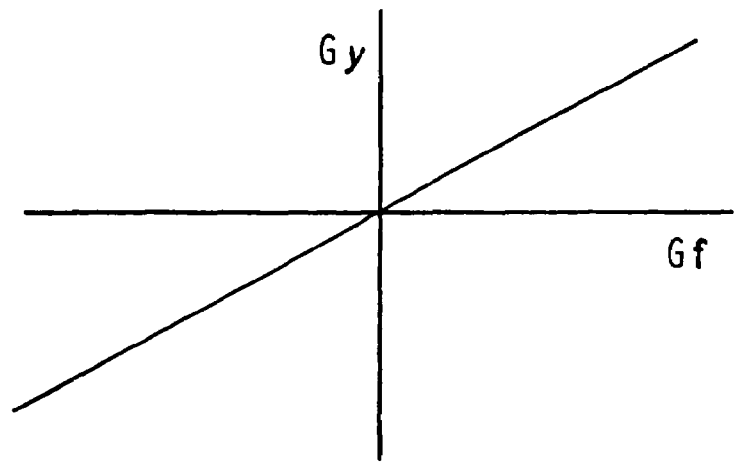
FIG. 10 shows the graph used to set (Gy).

Here, (Gy)=(Gf) (FIG. 10).

However, the present invention is not limited to this scheme. For example, one may adopt Gy=AGf, where A=1 in the high-speed region and a smaller value of (A) as the speed decreases.

Also, as stated above, for (YD), one may have $$YD = Tf \times \text{High}' - Tf \times \text{Low}' \times L1 \times L2 \quad (8)'$$

Figure 11:
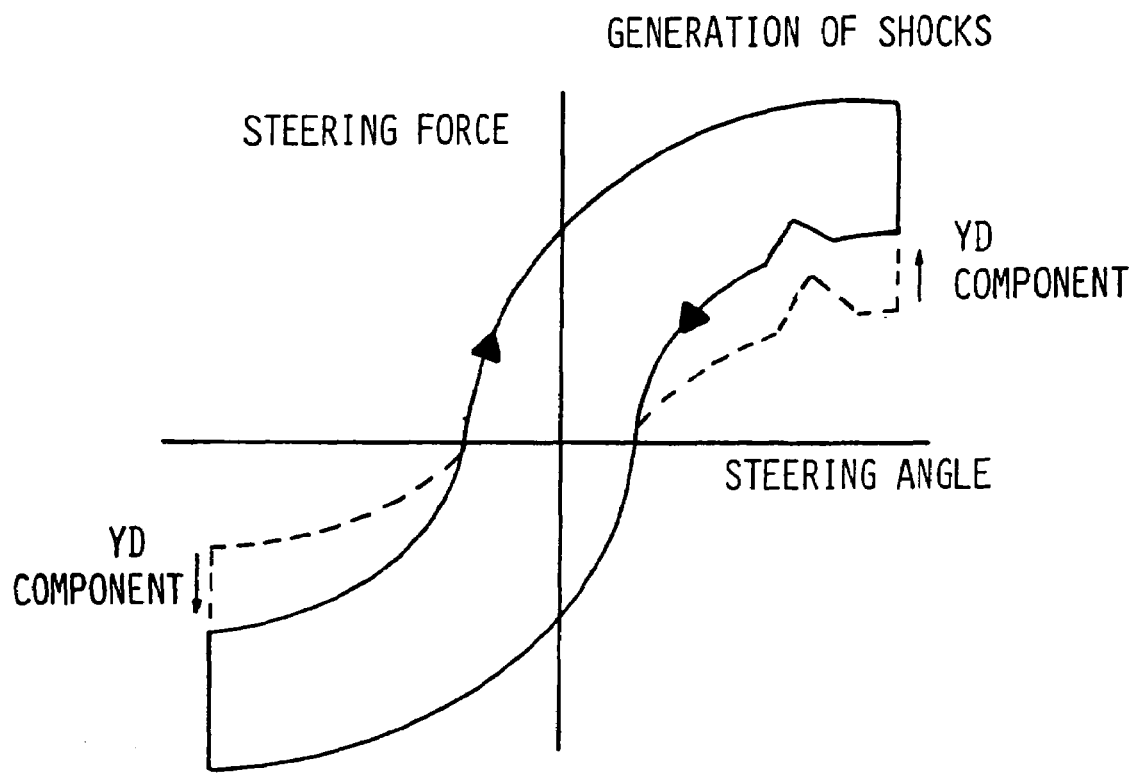
FIG. 11 is a graph of steering reaction force corresponding to steering angle in the turn and return operation of a steering wheel in accordance with the first embodiment of the invention.

FIG. 11 is a diagram illustrating the return steering operation of the second embodiment (solid lines) as compared to the first embodiment (dotted lines). Unlike the first embodiment, (YD) corresponding to the amount of feedback of the road surface reaction force is added to the steering force in the second embodiment. Consequently, when the road surface reaction force changes without influence of the lateral acceleration and yaw, it is possible to reduce the change in the steering force accompanying the shock, while preventing the steering force from becoming too small.

In the following, an explanation is given regarding the effects for the vehicle steering device of the second embodiment. In addition to effects as discussed regarding the first embodiment, the second embodiment also provides the following effect, in that the second embodiment of the invention has a steering reaction force correction value estimation means that estimates (YD) corresponding to the decrease in the amount of feedback of the road surface reaction force from yaw rate ψ. The steering reaction force correction means adds the steering reaction force component (Gy×YD) corresponding to yaw rate ψ. Consequently, it can reduce the change in the steering force, and it can prevent the steering force from becoming too small.

The third embodiment is an example of correcting the amount of feedback of the road surface reaction force when the vehicle is within the rotation limit region. In this case, the rotation limit region refers to the state in which lateral tire skidding takes place. Also, since the structure of the third embodiment is the same as that of the first embodiment shown in FIG. 1, it will not be explained in detail again.

Figure 12:
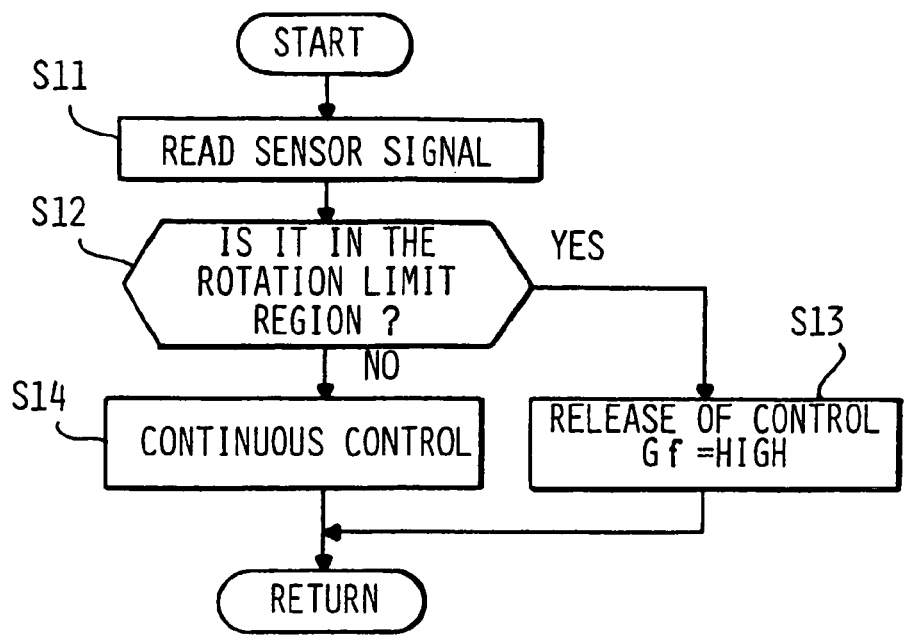
FIG. 12 is a flow chart illustrating the method used to set road surface reaction force feedback gain (Gf) according to a third embodiment of the invention.

In the following, an explanation is given regarding the operation of the third embodiment setting the road surface reaction force feedback gain is discussed hereinafter. FIG. 12 is a flow chart illustrating the method for setting road surface reaction force feedback gain (Gf) of the third embodiment. In the following, an explanation will be given regarding the various processing steps.

In step S11, the signals from steering angle sensor 11 and vehicle speed sensor 21 are read, and process control goes to step S12.

Figure 13:
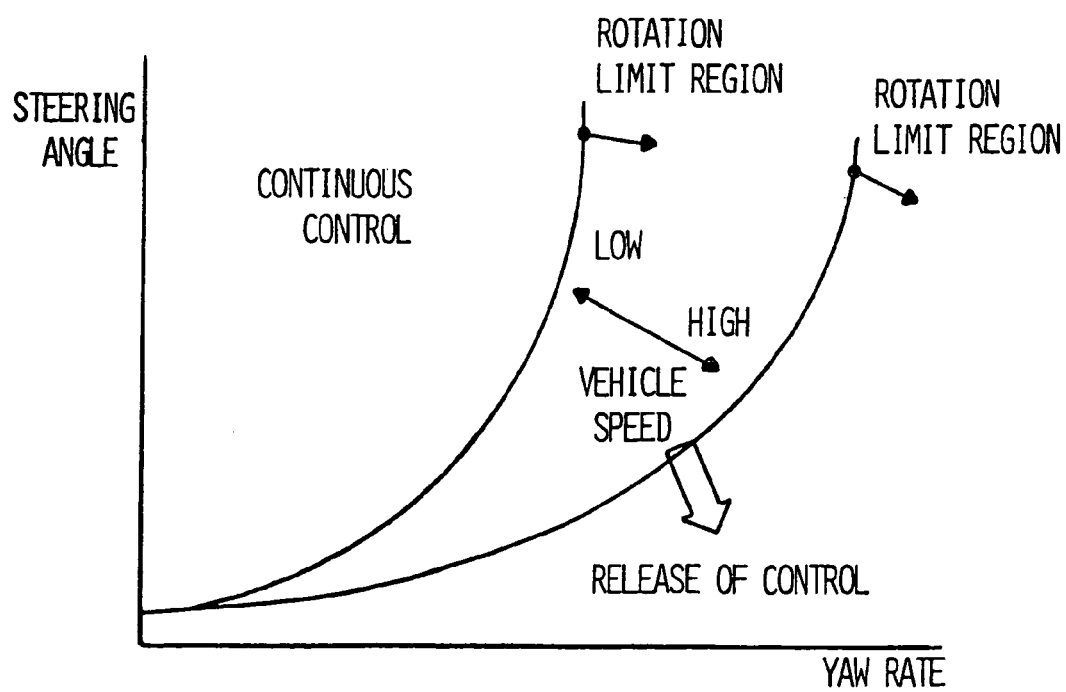
FIG. 13 is a graph of the rotation limit evaluation corresponding to yaw rate $\psi$ and the steering angle.

In step S12, from the steering angle of steered wheels 16, 16, vehicle speed V, and yaw rate Ψ of the vehicle read from step S11, it is determined whether the vehicle is within the rotation limit region with reference to the graph shown in FIG. 13 (corresponding to the rotation limit judgment means). If YES, it goes to step S13, and, if NO, it goes to step S14. In step S13, road surface reaction force feedback gain (Gf) is fixed at (High), and then process control returns. In step S14, control is continued by varying road surface reaction force feedback gain (Gf) in the steering wheel turn/return operation, and then it returns.

Return steering operation of the third embodiment will now be discussed. When the vehicle is within the rotation limit region, the driver corrects the vehicle behavior by means of correction steering. In this case, turn/return of steering wheel 6 is performed at high frequency in small increments/decrements. In this case, the scheme in transferring the amount of feedback of the road surface reaction force to the driver allows the driver to correct the vehicle behavior more easily.

Consequently, in the third embodiment, when the vehicle is within the rotation limit region, the correction control of the amount of feedback of the road surface reaction force is released. Consequently, the steering reaction force corresponding to the vehicle behavior can be transmitted to the operator. Consequently, accompanying the decrease in the amount of feedback of the road surface reaction force, the steering correction by the operator is not hindered.

In the third embodiment, in addition to the effects as discussed regarding the first embodiment, vehicle steering device has the following additional effect in that there is a rotation limit region judgment means that determines whether the vehicle is at the rotation limit on the basis of the steering angle of steered wheels 16, 16' and the yaw rate v of the vehicle. When it is judged that the vehicle is at the rotation limit, the steering reaction force correction means does not reduce the amount of the steering reaction force correction, so that by reducing the amount of feedback of the road surface reaction force, the steering correction operation by the driver is not hindered.

The above-mentioned embodiments have been described in order to allow easy understanding of the present invention. The invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

For example, one may also use the lateral acceleration as the vehicle state value. However, since the yaw rate usually changes faster than the lateral velocity, from the standpoint of system response, it is preferred that the yaw rate be used. Also, in the first embodiment, the yaw rate is computed using Equation 1. However, it is also possible to use the detection value from a yaw rate sensor. Also, a controller can include control function distributed among multiple processors.

This application is based on Japanese Patent Application No. 2004-350371, filed Dec. 2, 2004 in the Japanese Patent Office, the entire contents of which are hereby incorporated by reference.

What is claimed is:

1. A steering control device for use in a vehicle having a steering wheel that receives steering input, and an electronically-controlled steering unit that turns the vehicle's wheels over a road surface based on the position of the steering wheel, comprising:

a reaction force device coupled to the steering wheel and responsive to a control signal to apply a steering reaction force to the steering wheel; and a controller configured to generate the control signal in response to the movement of the steering wheel and the road surface reaction force, wherein the controller is configured to vary the control signal to increase the steering reaction force in response to the road surface reaction force, and to determine that the reaction force is larger when the steering wheel is turning than when the steering wheel is returning.

2. The steering control device of claim 1, wherein the controller is responsive to the angular velocity of the steering wheel, and is further configured to vary the control signal as a function of steering wheel angular velocity.

3. The steering control device of claim 2, wherein the controller is further configured to vary the control signal to decrease the steering reaction force at higher steering angular velocities.

4. The vehicle steering control device of claim 1, further comprising vehicle speed sensor wherein the controller is responsive to the vehicle speed sensor and is further configured to vary the control signal as a function of vehicle speed.

5. The steering control device of claim 3, wherein the controller is configured to vary the control signal to decrease the reaction force at lower vehicle speed.

6. The steering control device of claim 1, wherein the controller is further configured to calculate a vehicle state and an estimated steering force correction value based on the vehicle state, and to vary the control signal as a function of the estimated steering force correction value.

7. The steering control device of claim 6, wherein the controller is configured to vary the control signal to increase the steering reaction force by the steering force correction value.

8. The steering control device of claim 6, wherein the vehicle state is calculated based on information of the vehicle speed and yaw.

9. The vehicle steering control device of claim 1 wherein the controller is further configured to calculate whether the vehicle is within a rotation limit based on the angle of the wheels and the yaw rate of the vehicle, and wherein the controller is configured to not reduce the steering reaction force when the controller determines that the vehicle is within the rotation limit.

10. A vehicle, comprising:
(a) a steering wheel that receives steering input from an operator;
(b) an electronically controlled-steering device that turns the vehicle's wheels over a road surface based on the position of the steering wheel;
(c) a reaction force device coupled to the steering wheel and responsive to a control signal to apply a steering reaction force to the steering wheel; and
(d) and a controller configured to generate the control signal in response to the movement of the steering wheel and a road surface reaction force, wherein the controller is configured to vary the control signal to increase the steering reaction force in response to the road surface force when the steering wheel is turning and to decrease the steering reaction force in response to the road surface force when the steering wheel is returning.

11. The steering control device of claim 10, wherein the controller is responsive to the angular velocity of the steering wheel, and is further configured to vary the control signal as a function of steering wheel angular velocity.

12. The steering control device of claim 11, wherein the controller is further configured to vary the control signal to decrease the reaction force at higher steering angular velocities.

13. The vehicle steering control device of claim 10, further comprising vehicle speed sensor wherein the controller is responsive to the vehicle speed sensor and is further configured to vary the control signal as a function of vehicle speed.

14. The steering control device of claim 13, wherein the controller is configured to vary the control signal to decrease the reaction force at lower vehicle speed.

15. The steering control device of claim 10, wherein the controller is further configured to calculate a vehicle state and to estimate a steering force correction value based on the vehicle state, wherein the controller is configured to vary the control signal as a function of the estimated steering force correction value.

16. The steering control device of claim 15, wherein the controller is further configured to vary the control signal to increase the reaction force by the steering force correction value.

17. The vehicle steering control device of claim 10, wherein the controller is further configured to calculate whether the vehicle is within a rotation limit based on the angle of the wheels and the yaw rate of the vehicle, and to not reduce the steering reaction force when the controller determines that the is within the rotation limit.

18. An steering control apparatus for use in a vehicle having a steering wheel and a reaction device to impose a steering reaction force onto the steering wheel in response to a steering force control signal, comprising:
   steering force correction means for calculating the steering force control signal based on a road surface reaction force and a gain;
   judgment means for determining whether the steering wheel is in a turning or returning mode; and
   control means for setting the gain at a higher value when the steering wheel is in a turning mode.

19. A method for controlling steering in a vehicle having a steering wheel and a reaction device to impose a steering reaction force onto the steering wheel in response to a steering force control signal, comprising:
   calculating the steering force control signal based on a road surface reaction force and a gain;
   determining whether the steering wheel is in a turning or returning mode; and
   setting the gain at a higher value when the steering wheel is in a turning mode.

20. The method of claim 19, further comprising:
   determining the angular velocity of the steering wheel; and
   setting the gain at a lower value when the steering wheel has a higher angular velocity.

21. The method of claim 19, further comprising:
   determining the vehicle speed; and
   setting the gain at a lower value when vehicle speed is lower.

22. The method of claim 19, further comprising:
   calculating a vehicle state value; and
      estimating a steering reaction force correction value from the vehicle state value; and
      adding the steering reaction force correction value to the steering force control signal.

23. The method of claim 19, further comprising:
   determining whether the vehicle is within a rotation limit; and
   setting the gain to a predetermined high value when the vehicle is within the rotation limit.

* * * * *